(12) United States Patent
Teia Dos Santos Medes Gomes et al.

(10) Patent No.: US 9,816,438 B2
(45) Date of Patent: Nov. 14, 2017

(54) FLOW GUIDING SYSTEM AND ROTARY COMBUSTION ENGINE

(71) Applicant: Rolls-Royce Deutschland Ltd & Co KG, Blankenfelde-Mahlow (DE)

(72) Inventors: Luis Daniel Teia Dos Santos Medes Gomes, Berlin (DE); Carlos Hannover Galindo-Lopez, Berlin (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 238 days.

(21) Appl. No.: 14/644,746

(22) Filed: Mar. 11, 2015

(65) Prior Publication Data
US 2015/0260101 A1    Sep. 17, 2015

(30) Foreign Application Priority Data
Mar. 12, 2014  (EP) .................... 14159226

(51) Int. Cl.
*F02C 7/25*   (2006.01)
*F02C 7/18*   (2006.01)
*F02C 7/16*   (2006.01)
*F01D 11/24*  (2006.01)

(52) U.S. Cl.
CPC .............. *F02C 7/185* (2013.01); *F01D 11/24* (2013.01); *F02C 7/16* (2013.01); *F02C 7/18* (2013.01); *F02C 7/25* (2013.01); *F05D 2260/213* (2013.01); *F05D 2260/606* (2013.01); *Y02T 50/676* (2013.01)

(58) Field of Classification Search
CPC .... F02C 7/16; F02C 7/18; F02C 7/185; F02C 7/25; F01D 11/24
See application file for complete search history.

(56) References Cited

U.S. PATENT DOCUMENTS

| 4,163,366 A | 8/1979 | Kent |
| 4,304,093 A | 12/1981 | Schulze |
| 4,441,314 A | 4/1984 | Fitton |
| 4,849,895 A | 7/1989 | Kervistin |

(Continued)

FOREIGN PATENT DOCUMENTS

| EP | 2224099 | 9/2010 |
| WO | 9211444 | 7/1992 |

OTHER PUBLICATIONS

The Jet Engine, Chapter 14, p. 153-157 "Fire Protection".
European Search Report dated Jul. 22, 2014 from counterpart European App No. 14159226.1.

*Primary Examiner* — Steven Sutherland
(74) *Attorney, Agent, or Firm* — Shuttleworth & Ingersoll, PLC; Timothy Klima (57) ABSTRACT

A flow guiding system for a rotary combustion engine, in particular an aircraft jet engine. The flow guiding system comprises a bypass region positioned radially around a core region, a flow scoop device for guiding a first airflow from the bypass region, at least one flow guiding device for decoupling the flow regime in a region containing a flammable fluid from a flow regime in a region with tip clearance control by at least partially guiding at least one airflow divided from the first airflow, a second airflow directed into the region containing flammable fluid, and/or a third airflow directed into a region away from the region containing flammable fluid.

17 Claims, 10 Drawing Sheets

(56) References Cited

U.S. PATENT DOCUMENTS

| | | | | |
|---|---|---|---|---|
| 5,012,639 | A * | 5/1991 | Ream | B64D 29/00 |
| | | | | 60/226.1 |
| 6,925,814 | B2 * | 8/2005 | Wilson | F01D 11/24 |
| | | | | 415/178 |
| 2002/0005038 | A1 | 1/2002 | Boeck | |
| 2007/0245739 | A1 | 10/2007 | Stretton | |
| 2008/0112798 | A1 | 5/2008 | Seitzer et al. | |
| 2010/0150700 | A1 | 6/2010 | Strecker et al. | |
| 2010/0215481 | A1 | 8/2010 | Negulescu et al. | |
| 2010/0223905 | A1 * | 9/2010 | Todorovic | F01D 11/24 |
| | | | | 60/226.1 |
| 2010/0247297 | A1 * | 9/2010 | Legare | F01D 11/24 |
| | | | | 415/173.1 |
| 2011/0129332 | A1 * | 6/2011 | Behaghel | F01D 9/065 |
| | | | | 415/68 |

* cited by examiner

FLOW GUIDING SYSTEM AND ROTARY COMBUSTION ENGINE

CROSS-REFERENCE TO RELATED APPLICATION

This application claims priority to European Patent Application EP 14159226.1 filed Mar. 12, 2014, the entirety of which is incorporated by reference herein.

BACKGROUND

The invention relates to a flow guiding system for a rotary combustion engine and a rotary combustion engine.

Thermal management—i.e. cooling and heating respectively—is very important in rotary combustion engines like e.g., aircraft turbines. Certain parts of the engine are e.g., subjected to very high temperatures. Further acting upon the engine are mechanical loads e.g., through the rotation of a compressor or a turbine. The structure of the engine needs to be maintained within design limits during operations.

One aspect in maintaining the design limits is the active control of the tip clearance i.e., the distance between the tips of the turbine blades and the surrounding walls. These systems are e.g., known as ATCC (active tip clearance control systems). The tip clearance is—among other parameters like the radial expansion of the blades—influenced by the cooling of the wall surrounding the blades. The cooling medium can be e.g., air taken from the bypass region (bypass duct) of the engine which is channeled into the core region of the engine and guided towards the wall to be cooled. Such a system is e.g., described in EP 2 224 099 A2.

By channeling cooling air in the engine other engine design parameters might be influenced e.g., the concentration of a fire extinguishing medium necessary in the engine in a fire event. The design parameters set a certain concentration of the fire extinguishing medium (e.g. Halon) to be reached and maintained in certain regions of the engine within tight time limits.

SUMMARY

Therefore rotary combustion engines are required in which the thermal management of the engine and the fire extinguishing conditions are considered. Such a combined pair or requirements (thermal management and fire extinguishing) are not restrictive to rotary combustion engines, but also effective for vessel compartments or civil buildings, whereby the cooling or heating of an environment is compromised by maintaining a certain concentration of a fire extinguishing medium diluted in air.

This is addressed by using a flow guiding system for a rotary combustion engine with the features as described herein.

The flow guiding system for a rotary combustion engine, in particular an aircraft jet engine with a core region and a bypass region positioned radially around the core region, has a flow scoop device for guiding a first airflow from the bypass region, with at least one flow guiding device for decoupling the flow regime in a region containing a flammable fluid from a flow regime in a region with tip clearance control by at least partially guiding at least one airflow divided from the first airflow, a) a second airflow directed into the region containing flammable fluid, and/or b) a third airflow directed into a region away from the region containing flammable fluid.

The flow guiding device for decoupling the flow regimes within the engine introduces an additional design parameter which allows the independent flow design within the engine. For example the flow divide device allows the adjustment of the flow regime of the second airflow so that e.g., the predetermined concentrations of a fire extinguishing medium can be attained.

In one embodiment the second airflow is heating or cooling at least a part of the core region, in particular at least a part of the wall of the core region in the vicinity of the blades of a turbine, in particular to control the size of the tip clearance.

In a further embodiment the third airflow is heating or cooling at least partially a wall of a compartment being part of the region away from the flammable fluid.

The at least one flow guiding device can in one embodiment comprise a wall element for guiding the second airflow and/or the third airflow. It is also possible that the at least one flow guiding device comprises an air curtain (or fence) to keep the flow regimes in two regions of the engine essentially separate.

In an another embodiment a control device for the at least one flow guiding device adjusts at least one of the airflows depending on at least one operating parameter of the engine, in particular the rotational speed of the engine, an indication of the fuel supply to the burners e.g. setting the engine into Windmill shuts the fuel off, therefore initiating a possible fire extinguishing action where airflows are to be regulated to meet fire extinguishing concentration requirements, a temperature measurement, a pressure measurement, a status of a valve and/or the altitude of the engine above ground.

In particular, in one embodiment the at least one flow guiding device comprises a flow control device adjusting at least one of the airflows and/or the ratio of the second airflow to the third airflow so that the concentration of a fire extinguishing medium, in particular Halon within at least a part of the region with flammable fluid is kept within the predetermined design limits.

The flow control device can also be coupled to at least one valve and/or deflector affecting at least one of the airflows and/or affecting the position of at least one part of the compartment, in particular the at least one wall-like flow guiding device. The valve can e.g., be a magnetic, hydraulic, fuel driven, electric or pneumatic valve.

In a rotary combustion engine like e.g. an aircraft engine a plurality of flow guiding devices can be azimuthally positioned around to the machine axis of the engine.

In further embodiment the core region comprises a plurality of scoop devices and/or outlets for the third airflow from the compartment to the bypass region.

To introduce a further design parameter, at least one diverter means and/or valve can divert at least a part of the first airflow to form at least one subflow, in particular with an adjustable diverter means and/or valve. This relatively cool subflow can be mixed with the second airflow and/or the third airflow. Additionally or alternatively, the at least one subflow is used to cool another airflow in a heat exchanger. This provides additional means to adjust the temperature within the air flow regime in the engine.

It is also possible that a plurality of scoop devices and/or openings are positioned azimuthally around the machine axis.

The problem is also solved by a rotary combustion engine, in particular an aircraft engine with at least one flow guiding system as described herein.

BRIEF DESCRIPTION OF THE DRAWINGS

Embodiments of the invention are exemplary described in the figures.

DETAILED DESCRIPTION

Figure 1:
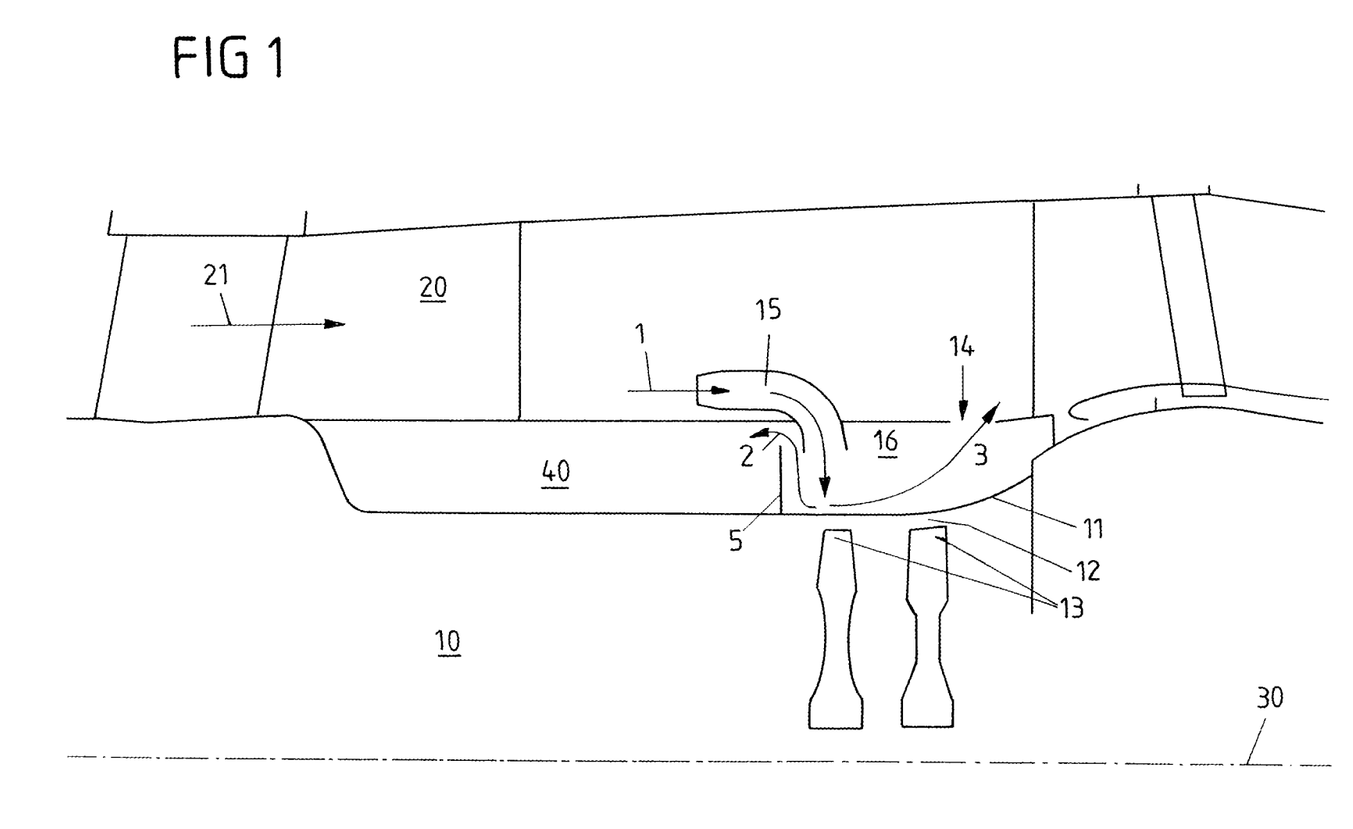
FIG. 1 shows a schematic cross-section of a part of an aircraft engine with a first embodiment of the invention.

In FIG. 1 a schematic cross-section of a bypass region 20 surrounding a core region 10 of a turbofan aircraft engine is shown.

A part (not shown in FIG. 1) of the air entering the engine is compressed fully in the core region 10 and passed into the combustion chamber.

The other part of the airflow 21 entering the engine which is less compressed passes through the bypass region 20 surrounding the core region 10 of the engine.

In the bypass region 20 of the engine a scoop device 15 is channeling a first airflow 1 that is part of the general airflow 21 in the bypass region 20 into an inner part of the engine, here a region comprising a (mixture of air and) flammable fluid 40 and a compartment 16 which is adjacent to blades 13 of a turbine in the engine.

The region comprising a (mixture of air and) flammable fluid 40 in many cases extends around the engine and it is desirable to keep the concentration of the flammable fluid within design ranges (by means of ventilating it), however, a fire extinguishing medium to be mixed with air in 40 at a prescribed tight concentration rate constrains such ventilation. This zone might also include the region within the bifurcation of the engine i.e., the structural link between the core region 10 and the mounting of the engine with the aircraft. The flammable fluid will comprise not only one substance, but a mixture of flammable vapors.

In the embodiment shown in FIG. 1 the compartment 16 is a separate region away from the region comprising a flammable fluid 40.

The scoop device 15 has in this embodiment e.g. hook-like shape. Here only one scoop device is shown but more than one can be used on the engine. Furthermore the shape of the scoop device 15 can be different in alternative embodiments.

The opening of the scoop device 15 points towards the flow direction of the airflow 21, i.e., in the embodiment shown towards the front of the aircraft engine. In other embodiments the scoop device 15 can be formed differently e.g., comprising a slit raised from the core region 10 into the airflow 21 in the bypass region 20. In any case, a part of the bypass airflow 21 is directed into the core region 10 engine.

The incoming airflow 1 is here directed into the compartment 16 comprising a relatively hot wall 11 of the core region 10. The hot wall 11 is adjacent to the blades 13 of the turbine in this embodiment.

The relatively cool air in the first airflow 1 cools that wall 11 during the operation of the engine. Radially inside of the wall 11 the turbine blades 13 have a tip clearance 12 between the tips of the blades 13 and said wall 11. The first airflow 1 effects a convective cooling of the wall 11 i.e., the displacement of the wall due to thermal effects is affected by the cooling. This helps in controlling the size of the tip clearance 12.

The airflows 2, 3 are guided into two separate directions, one second airflow 2 generally towards the front of the engine towards the region comprising a flammable fluid 40, a third airflow 3 through the compartment 16 generally towards the rear end of the engine. The flow regime of the second and third airflow 2, 3 can be more complex (see e.g. FIG. 4 to 5), but the overall directions are opposite to each other. The second airflow 2 leaves the region comprising a flammable fluid 40 into the bifurcation of the engine not shown in the Figures.

In the first embodiment shown in FIG. 1 a flow guiding device 5 affects i.e., guides the second airflow 2, by providing a partial opening from the compartment 16 to the region comprising flammable fluids 40. Therefore, the flow guiding device 5 effects a partially blocking of the airflow 2.

By guiding (or constricting) the second airflow 2 it affects (and thereby it can adjust) the third airflow 3 leaving the compartment 16 through an opening 14 (or a vent) into the bypass region 20.

In this embodiment the flow direction of the second airflow 2 is against the direction of the main airflow through the engine. The overall direction of the third airflow 3 is in the direction of the main airflow of the engine.

The first airflow 1 coming from the scoop device 15 is divided into two parts. The second airflow 2 is directed towards a part of the core region 10 comprising flammable fluids 40. Here it has e.g., the purpose to purge possibly flammable or explosive gases from the core region 10, to prevent an ignition and/or to extinguish flames.

In other embodiments, the region comprising flammable fluids 40 can extend from the core region 10 of the engine into parts of the bypass region 20.

The compartment 16 has at least one entry after the scoop device 15 and at least one opening to the bypass region 14.

The flow guiding device 5 introduces at least one additional design parameter that is the ratio between the second airflow 2 and the third airflow 3. With this design parameter the setting of the required concentration of a fire extinguishing medium and the temperature in the compartment 16 (i.e. tip clearance control) can both be approached in a more flexible way. The temperature in the region comprising a flammable fluid 40 does not affect the tip clearance control.

In this sense, the flow guiding device 5 in the first embodiment shown comprises a wall- or fence-like structure allowing a decoupling of the airflow which is responsible for maintaining a certain ventilation (here by the second airflow 2) from a different airflow (here the third airflow 3).

In FIG. 1 one scoop device 15, one flow guiding 5 and one compartment 16 each are shown. In other embodiments, a plurality of these means are used. For example three of these means 15, 5, 16 can be used azimuthally located around the core region 10 of the engine. This is shown in FIG. 4 to 7 which will be described below. As will be seen, the flow regime in the engine can be very complex (e.g. by complex shaped channels, ducts and chimneys in the engine), even though the principles described in context with FIG. 1 are applicable.

The embodiment shown in FIG. 1 uses a flow guiding device 5 which is structurally fixed relative to the other parts of the bypass region 20 or core region 19. In particular it is part of the compartment 16.

Figure 2:
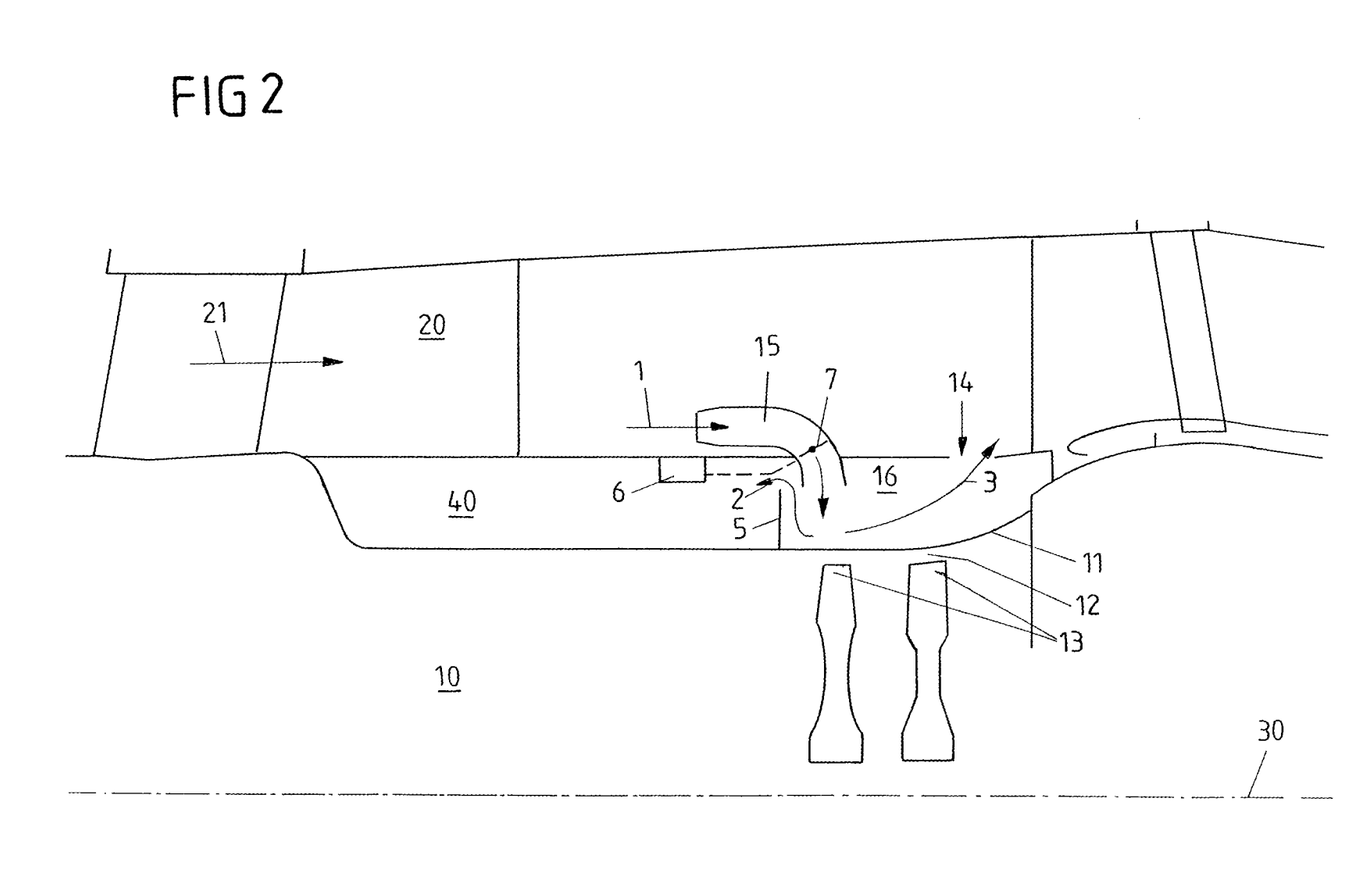
FIG. 2 shows a schematic cross-section of a part of an aircraft engine with a second embodiment.

In FIG. 2 a variation of the first embodiment shown in FIG. 1 is depicted. Here the flow guiding device 5 is coupled with a flow control device 6. FIG. 2 shows essentially the same embodiment than FIG. 1 but for the flow control device 6 which can act upon the flow guiding device 5. In the embodiment shown a valve 7 (e.g. a butterfly valve) in the scoop device 15 is actuated by the flow control device 6 so that the mass flow rate of the first airflow 1 is controlled.

Alternative or additional valves (not shown in FIG. 2) could be added into the flow path of the second airflow 2 and/or the third airflow 3 to control the flows. Thereby the amount of air reaching the region comprising flammable fluids 40 and/or the bypass region 20 with the third airflow 3 can be adjusted. All these valves work together with the flow guiding device 5 in controlling the airflow and air-build-up in the regions downstream the scoop device 15.

The person skilled in the art will recognize that the flow control device 6 can act upon the airflows 1, 2, 3 in different ways, even without using valves.

Figure 3:
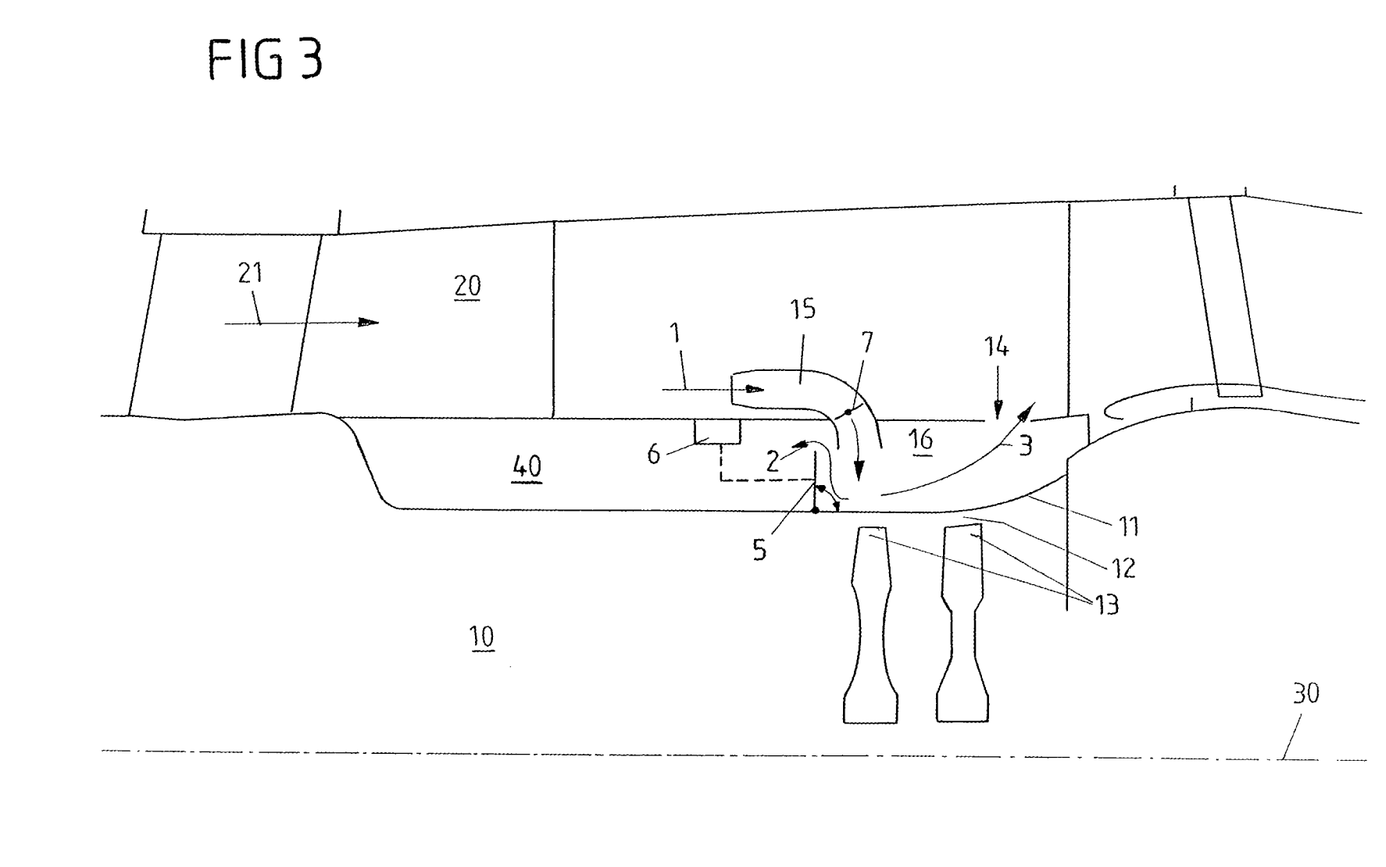
FIG. 3 shows a schematic cross-section of a part of an aircraft engine with a third embodiment.

In FIG. 3 a third embodiment is shown being a variation of the second embodiment. In the third embodiment the flow guiding device 5 is movably connected to the engine, here to the wall of the core region 10. The flow control device 6 can adjust the angle relative to the outlet of the compartment 16 to the region comprising flammable fluid 40. The tilt of the flow guiding device 5 determines the ratio between the second airflow 2 and the third airflow 3.

In a variation of the embodiments shown in FIGS. 1, 2 and 3 a valve could be placed at the outlet of the compartment 16 to control the flow regime within the compartment 16.

In FIG. 1 to 3 the cross-sectional views are simplified. In many cases the cooling for tip clearance control is effected by complex tubing arrangements within the core region 10. This is not shown in the figures discussed above.

Figure 4:
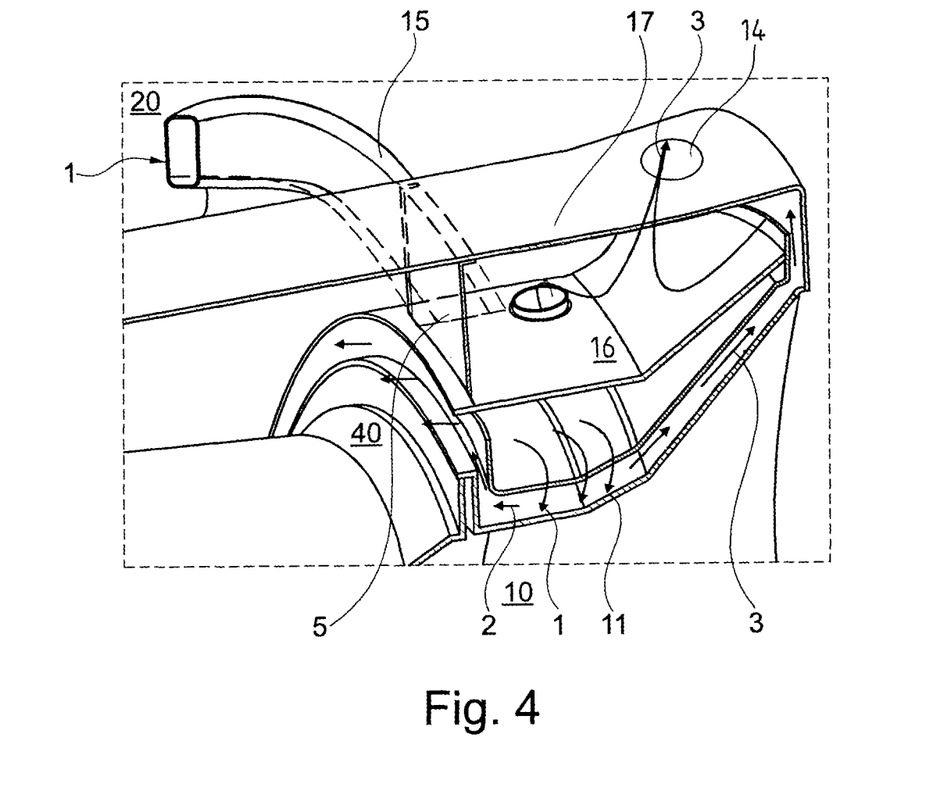
FIG. 4 shows a perspective and cut view of a fourth embodiment in an aircraft engine.

In FIG. 4 a perspective sectional view of a part of an aircraft engine is shown to illustrate a further embodiment.

The scoop device 15 diverts the first airflow 1 into from the bypass region into inner parts of the engine i.e., the compartment 16 and the region comprising a flammable fluid 40.

The first airflow 1 is directed towards the hot wall 11 of the casing of the core region 10 of the engine. The compartment 16 extending ring-like around the core region 10 of the engine comprises holes through which the first airflow 1 is directed to the hot wall 11. The heated air flows into two directions, the second airflow 2 towards the front of the engine, the third airflow 3 towards the rear of the engine. Even though the second and third airflows 2, 3 take tortuous route through different parts of the engine, the overall direction of both airflows 2, 3 point in different directions.

Figure 5:
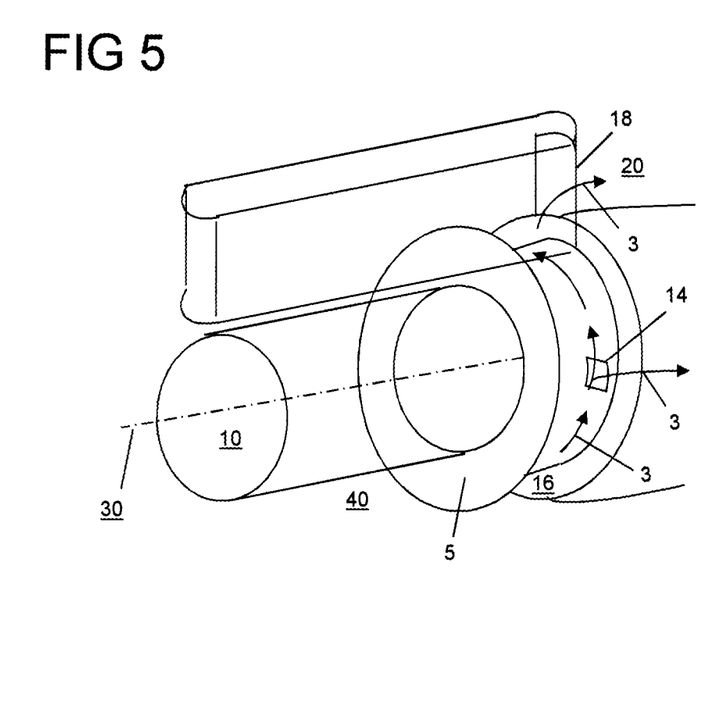
FIG. 5 shows a schematic perspective view of a part of an aircraft engine indicating the flow of the third airflow into bypass duct.

The heated air of the second airflow 2 flows through openings into the region comprising flammable fluids 40. The flow going into the region comprising flammable fluids 40 has two purposes: ventilation to prevent accumulation of flammable fluids beyond a certain threshold and cooling since that region is exposed to intense radiation from combustor casing during normal cruise flight, heating it up. The second airflow 2 provides a heat sink to extract heat through forced convection. In FIG. 5 the flow path of the third airflow 3 is shown in a schematic drawing.

The flow guiding device 5 in this embodiment does not directly guide the second airflow 2 as in the first three embodiments. In the fourth embodiment the flow guiding device 5 blocks off the region which is filled with a part of the third airflow 3 from other regions of the engine. After being heated a part of the third airflow 3 flows through a mid opening 17 into a space which is blocked off against the region comprising flammable fluid 40 by the flow guiding device 5 which in this example is a "wall-like" structure in this embodiment. Other "wall-like" structures or shapes can be considered as long as they impart the same separation function between region 16 and 40. The wall-like structure is only partially shown in FIG. 3. The flow guiding device 5 does extend azimuthally around the core region 10 of the engine as can be best seen in FIG. 5 or 6 and in FIG. 7.

The part of the third airflow 3 which is not flowing through the mid opening 17 flows along the wall 11 and leaves the core region 10 of the engine via an outlet into compartment 16 then into the bypass pass region 20. This is shown in FIG. 5.

Figure 6:
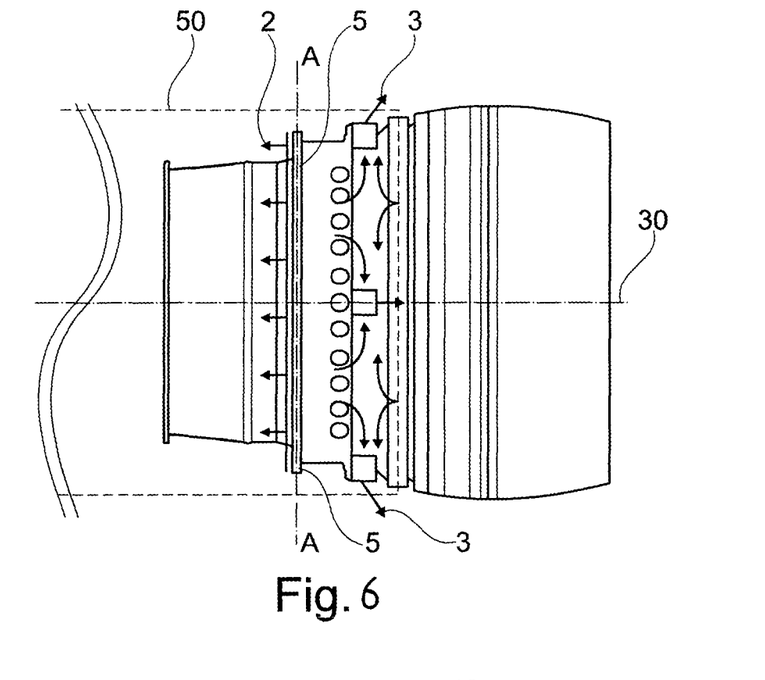
FIG. 6 shows a side view of the embodiment shown in FIG. 4.

FIG. 6 shows the effect caused by the introduction of the flow guiding device 5. The dashed line 50 shows the extent of the region with flammable fluids 40 without the flow guiding device 5. In this situation the heated airflows 2, 3 would fill the region 50 without being able to adjust the conditions in different regions of the engine. The introduction of the flow guiding device 5 allows a decoupling of the airflows 2, 3.

Figure 7:
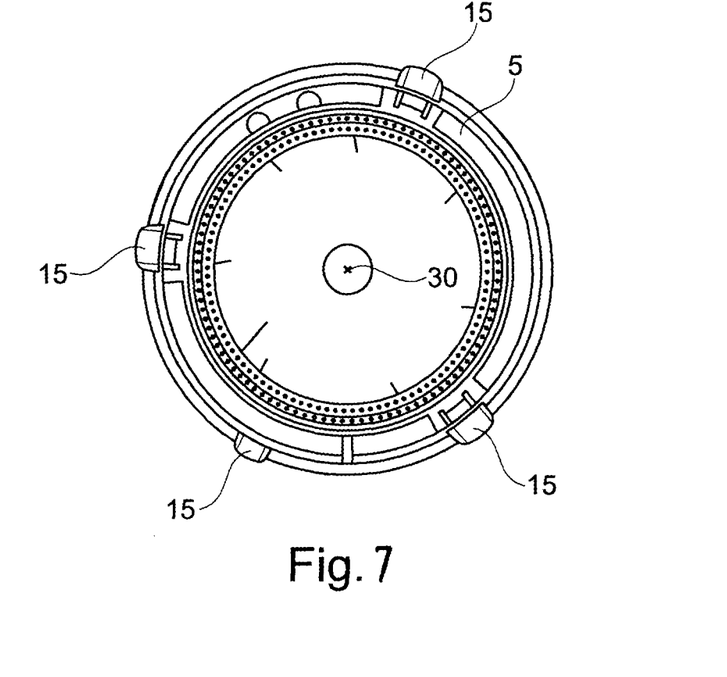
FIG. 7 shows a cross-section indicated by A-A in FIG. 6.

In FIG. 7 a cross-section along line A-A in FIG. 6 is shown. Here four scoop devices 15 and the flow guiding device 5 are shown. The four scoop devices 15 are azimuthally and non-symmetrically positioned around on the engine. In other embodiments two, three or more than four scoop devices could be used.

Figure 8:
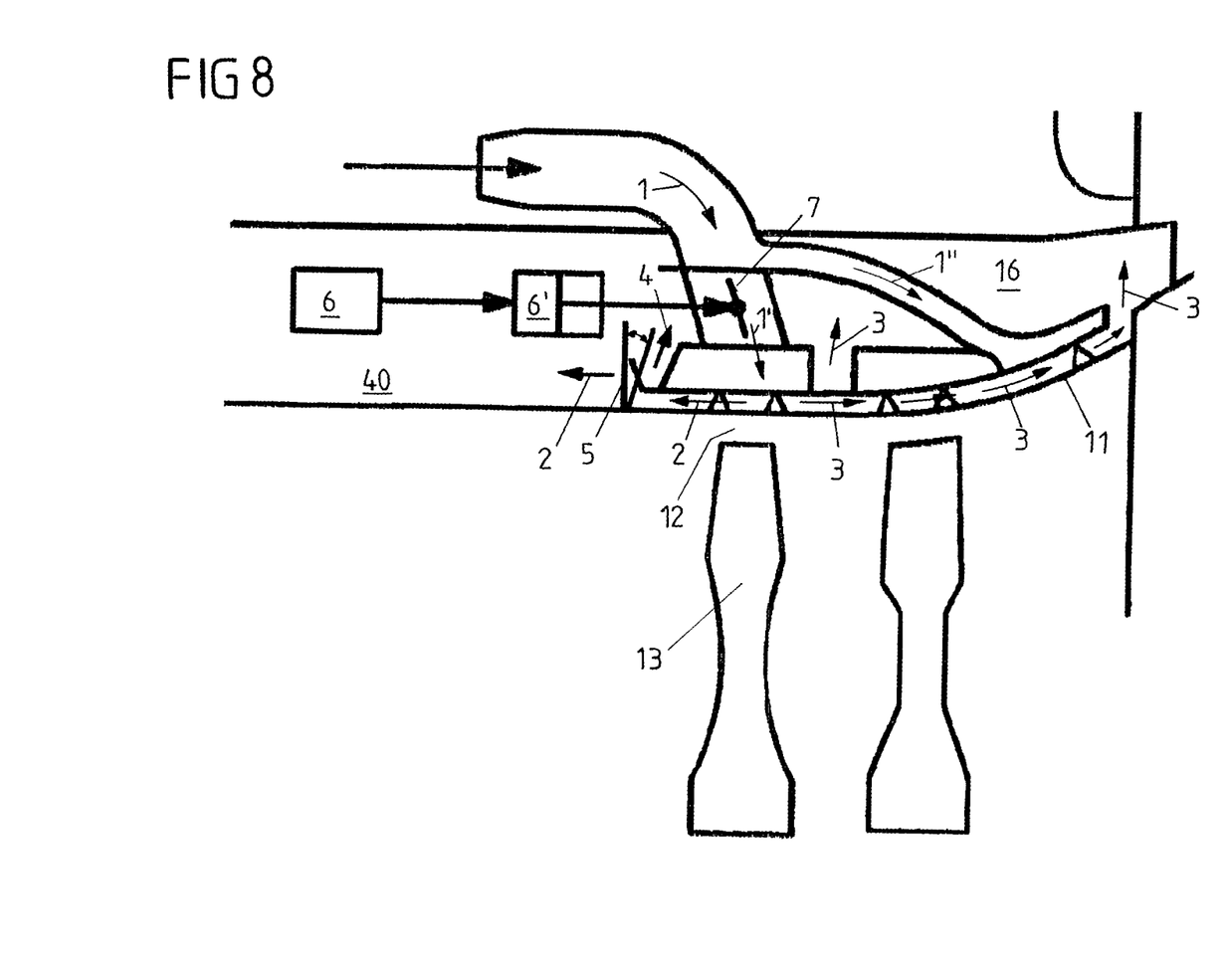
FIG. 8 shows a schematic cross-section of a part of an aircraft engine with a fifth embodiment.

In FIG. 8 a modification of the second embodiment is shown as a fifth embodiment so that in principle the description regarding FIG. 2 is applicable. Here a control device 6 is coupled with an actuator 6' to operate the valve 7.

In the fifth embodiment, the first airflow 1 is split into two subflows 1', 1". The first subflow 1' passes the valve 7 to cool the relatively hot wall 11. The second subflow 1" of the first airflow is diverted towards the rear of the compartment 16 to cool the wall 11 i.e., it is part of the tip clearance control.

In variations of the fifth embodiment more than one air flow can be controlled by different valves 7.

The heated airflows 2, 3 take different paths, guided in part by the flow guiding device 5.

The second airflow 2, generally directed towards the front of the engine enters the region comprising flammable fluids 40.

The flow guiding device 5 shown here comprises a wall with an adjustable inclination to create a radially outward directed air curtain like flow 4. Hence, the flow guiding device 5 comprises the air curtain flow 4. This air curtain like flow 4 forms one boundary of the compartment 16 to decouple the second and third airflows 2, 3. Therefore it is not necessary to close the compartment 16 with a rigid wall but the decoupling of the airflows 2, 3 can be obtained by other means such as a "virtual wall". i.e. the air curtain, so that flames cannot propagate to the compartment 16.

Figure 9:
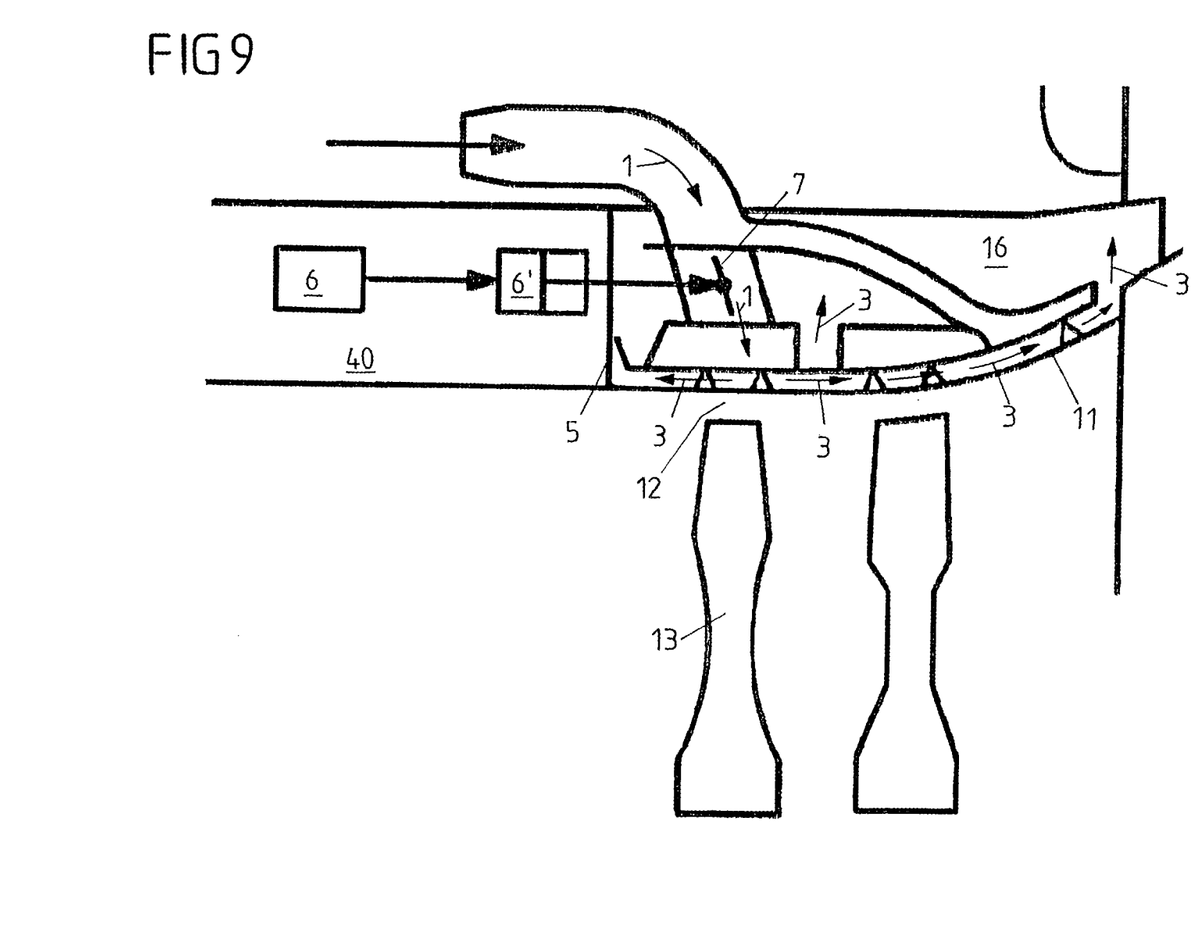
FIG. 9 shows a schematic cross-section of a part of an aircraft engine with a sixth embodiment.

In the embodiment shown in FIG. 9 the compartment 16 is completely walled off by the flow guiding device 5, i.e. there is no flow between the region comprising the flammable fluid 40 and the compartment 16. The flow guiding device 5 effects a complete decoupling of the region with a flammable fluid 40 and the compartment 16 which comprises the hot wall 11 which is cooled by the third airflow 3 to achieve an improved tip clearance control. Like in the embodiment shown in FIG. 8, the mass flow rate of the first airflow 1 into the compartment 16 is controlled by a valve 7 actuated by the control device 6. In other aspects this embodiment is a variation of the previously described embodiments. In case where such a valve 7 is not included, the flow guiding device 5 and the outlets 14 together can also control the mass flow rate towards compartment 16 comprising the hot wall 11, thereby setting the tip clearance control.

During normal operation the second airflow 2 is desired for ventilation as in embodiments described above. Regarding cooling, if the temperature of the second airflow 2 is adequate it cools the walls in the region comprising a flammable fluid 40. If temperature is too high due to particular engine operating conditions (e.g. the tip clearance control being closed), it is desired to prevent an airflow to go to compartment 40. For fire extinguishing, if the second airflow 2 goes to zero, the effectiveness of the fire extinguishing system goes to maximum (i.e. maximum Halon concentration). Therefore the embodiments e.g. shown in FIG. 9 with a complete separation the region comprising a flammable fluid 40 and the compartment 16 is more effective for achieving the fire extinguishing conditions.

Figure 10:
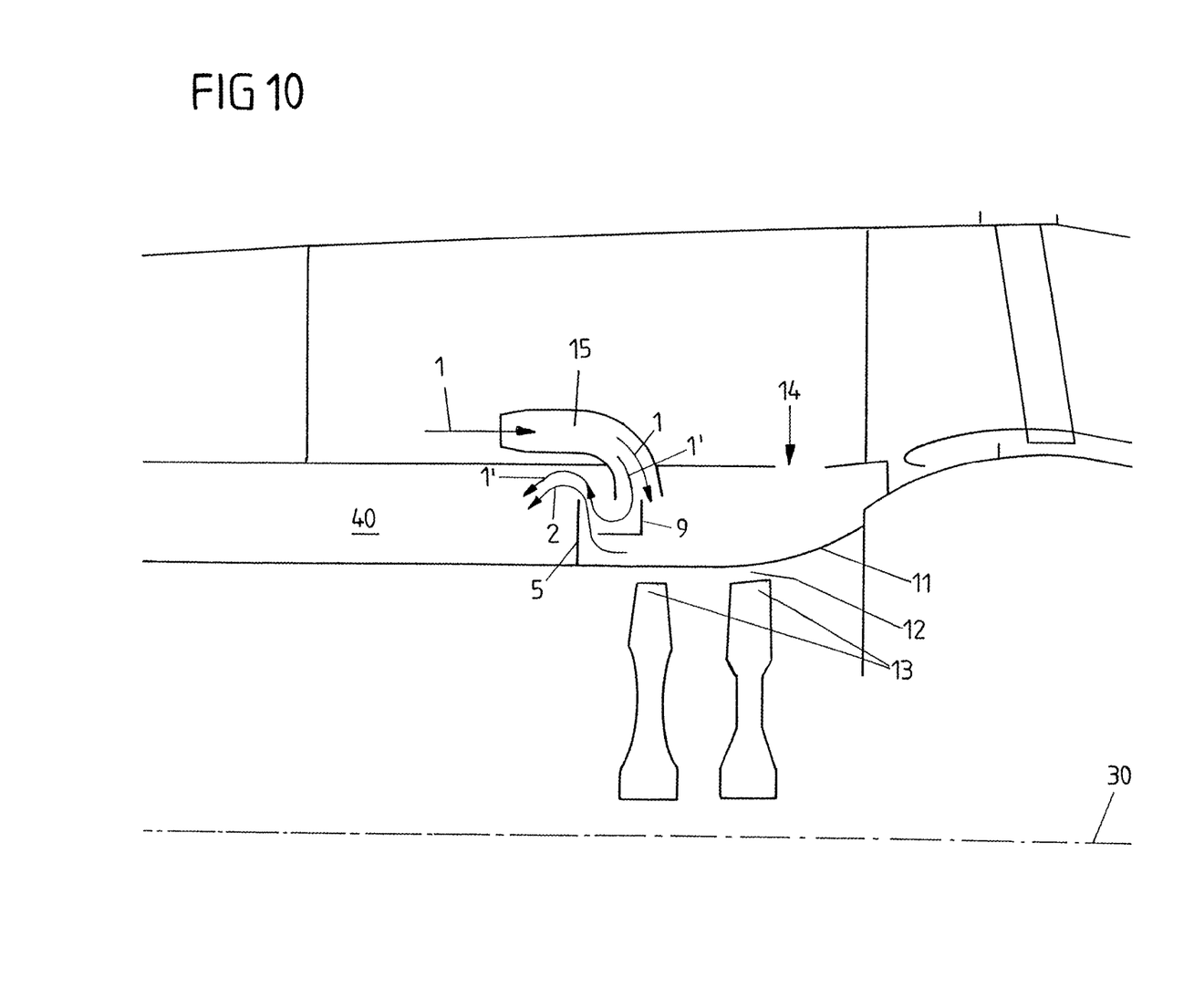
FIG. 10 shows a schematic cross-section of a part of an aircraft engine with a seventh embodiment.
Figure 11:
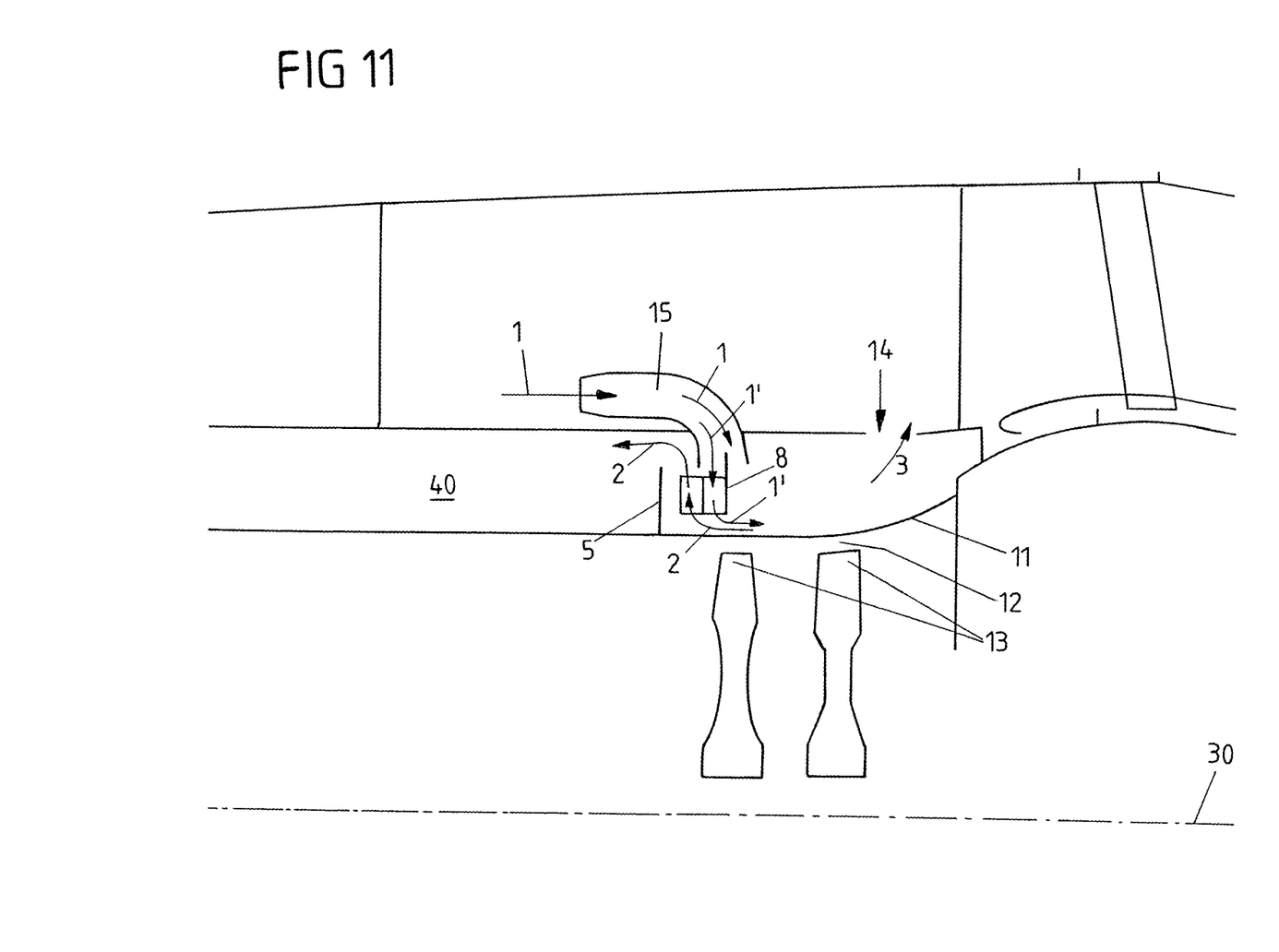
FIG. 11 shows a schematic cross-section of a part of an aircraft engine with an eighth embodiment.

FIGS. 10 and 11 embodiments—all being variants of the above described embodiment—are shown which use a subflow 1''' of the incoming airflow 1 which is not used for cooling the wall 11. Otherwise the embodiments show the same structure as the first embodiment so that the relevant description is also applicable here.

In the embodiment shown in FIG. 10 the subflow 1''' is diverted by a diverting means 9 from the incoming airflow 1 and mixed with the second airflow 2 which is flowing into the region comprising the flammable fluid 40. The combined airflow in this region has a cooler temperature as the second airflow 2 without this diversion. If an appropriate valve device is used as a diverter means for the subflow 1''' (not shown in FIG. 10) the temperature and/or flow rate in the different regions in the engine can adjusted. The diversion can e.g., be obtained by adding an extra channel within the scoop device 15 as an active (i.e. movable) diverter means 9 or a passive flow guide 9 as shown in FIG. 10. It should be noted that temperature of the second airflow can also be regulated by allowing more flow 1 to reach the wall 11 per se, however, the wall temperature change (and therefore tip clearance) are constrained to further features than in embodiment in FIG. 10.

In the embodiment depicted in FIG. 11 the subflow 1''' is diverted (e.g. by diverter means 9 not shown in FIG. 11, but e.g. like in FIG. 10) into a heat exchanger 8. Here the cool air of the subflow 1''' exchanges heat in a counterflow with the second airflow 2 which has been heated by the hot wall 11. The subflow 1''' then flows back into the compartment 16. The heated air of the second airflow 2 flows in to the region comprising the flammable fluid 40. As in the previously described embodiment, the airflow into the region comprising the flammable fluid 40 is cooled that way.

As illustrated previously, FIG. 5 shows schematic perspective view of an embodiment in which the flow guiding device 5 comprises a wall azimuthally creating a barrier between the region comprising a flammable fluid 40 (shown without the outer wall) and the compartment 16 towards the rear of the engine.

The scoop device 15 and the cooling second airflow 2 and the flow of the third airflow close to the core region 10 are not shown in FIG. 5 (but e.g. in FIG. 9). After cooling the wall 11 in the core region 10 the third airflow enters an annual compartment 16 already shown in FIG. 5 through an opening 14. The third airflow 3 fills that compartment 16 and leaves it into the bypass region through an outlet opening 18 through a bifurcation (i.e. one of the connections between core and nacelle).

As will be appreciated from the above described embodiments, there are numerous ways of guiding airflows 2, 3, through the inner parts of the engine after they have e.g. achieved their cooling effect on the wall 11. The guiding means (e.g. the opening 14, the mid opening 17 or the outlet opening 18) are just examples. Other embodiments might use chimney extending from a deeper part of the engine towards an outer part of the engine.

In the embodiments the thermal management has mostly been described in the context of cooling (e.g. the cooling of the hot wall 11). Embodiments of the invention can also be applied to heating certain parts of a rotary combustion engine. The tip clearance control has been described in context of the tip clearance of a turbine in the rotary combustion engine. Embodiments of the invention can also be applied for the tip clearance control of compressors.

All embodiments shown here refer to aircraft engines. The same principles also apply to stationary rotary combustion engines, like gas turbines in power stations.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims. All language of distinction and disparagement with respect to certain features is intended to indicate a lack of preference for those features, but not to exclude such from the scope of the disclosure entirely unless otherwise indicated. Various features of the various embodiments disclosed herein can be combined in different combinations to create new embodiments within the scope of the present disclosure.

REFERENCE NUMBERS 1 first airflow
1', 1" subflows of first airflow
1''' subflow diverted from first airflow
2 second airflow
3 third airflow
5 flow guiding device
6 control device for flow guiding device
6' actuator for valve
7 valve for the first airflow
8 heat exchanger
9 diverter means
10 core region
11 wall in the core region
12 tip clearance
13 blade
14 openings for third airflow
15 scoop device
16 compartment
17 mid opening
18 outlet opening
20 bypass region
21 airflow in the bypass region
30 machine axis
40 region comprising flammable fluids
50 extent of the region comprising flammable fluids without fluid guiding device

The invention claimed is:

1. An aircraft jet engine, comprising
a core region;
a bypass region positioned radially around the core region,
a flow scoop device for guiding a first airflow from the bypass region,
at least one flow guiding device for decoupling a flow regime in a region containing a flammable fluid from a flow regime in a region with tip clearance control by at least partially guiding at least one airflow divided from the first airflow into:
   a) a second airflow directed into the region containing flammable fluid, and
   b) a third airflow directed into a region away from the region containing flammable fluid.

2. The aircraft jet engine according to claim 1, wherein the second airflow heats or cools at least a part of a wall of the core region in a vicinity of blades of a turbine to control a size of the tip clearance.

3. The aircraft jet engine according to claim 1, wherein the third airflow heats or cools at least partially a wall of a compartment being part of a region away from the flammable fluid.

4. The aircraft jet engine according to claim 3, wherein the at least one flow guiding device comprises an air curtain to keep the flow regimes in the two regions essentially separate.

5. The aircraft jet engine according to claim 4, wherein the flow control device is coupled to at least one chosen from a valve and a deflector affecting at least one chosen from the first airflow, the second airflow, the third airflow and a position of at least one part of the compartment.

6. The aircraft jet engine according to claim 5, wherein at least one part of the compartment is a wall element.

7. The aircraft jet engine according to claim 3, and further comprising a plurality of at least one chosen from scoop devices and openings for the third airflow from the compartment to the bypass region.

8. The aircraft jet engine according to claim 1, wherein the at least one flow guiding device comprises a wall element for guiding at least one chosen from the second airflow and the third airflow.

9. The aircraft jet engine according to claim 1, and further comprising a control device for controlling the at least one flow guiding device to adjust at least one chosen from the first airflow, the second airflow and the third airflow depending on at least one operation parameter of the aircraft jet engine, including at least one chosen from a rotational speed of the aircraft jet engine, an indication of a fuel supply to burners of the aircraft jet engine, a temperature measurement, a pressure measurement, a status of a valve and an altitude of the aircraft jet engine above ground.

10. The aircraft jet engine according to claim 9, wherein the at least one flow guiding device comprises a flow control device adjusting at least one chosen from the first airflow, the second airflow, the third airflow and a ratio of the second airflow to the third airflow so that a concentration of a fire extinguishing medium within at least a part of the region with flammable fluid is kept within predetermined design limits.

11. The aircraft jet engine according to claim 1, wherein the at least one flow guiding device includes a plurality of flow guiding devices azimuthally positioned to a machine axis of the aircraft jet engine.

12. The aircraft jet engine according to claim 1, and further comprising at least one chosen from a diverter and a valve to divert at least a part of the first airflow to form at least one subflow.

13. The aircraft jet engine according to claim 12, wherein the at least one subflow is mixed with at least one chosen from the second airflow and the third airflow.

14. The aircraft jet engine according to claim 12, wherein the at least one subflow is used to cool another airflow in a heat exchanger.

15. The aircraft jet engine according to claim 1, and further comprising a plurality of at least one chosen from scoop devices and openings positioned azimuthally around a machine axis.

16. The aircraft jet engine according to claim 1, wherein the second airflow has a direction of flow opposite a direction of flow of the third airflow.

17. The aircraft jet engine according to claim 1, and further comprising a control device for controlling the at least one flow guiding device to adjust at least one chosen from the second and third airflows, upon setting the aircraft jet engine into Windmill and shutting off a fuel supply to the burners, to initiate a possible fire extinguishing action where airflows are to be regulated to meet fire extinguishing concentration requirements.

* * * * *